United States Patent
Arness et al.

(10) Patent No.: US 7,484,928 B2
(45) Date of Patent: Feb. 3, 2009

(54) REPAIRED TURBINE NOZZLE

(75) Inventors: Brian Peter Arness, Simpsonville, SC (US); Graham David Sherlock, Greenville, SC (US); Joseph Leonard Moroso, Greenville, SC (US); Stewart William Beitz, Greenville, SC (US); Graydon Wayne Peters, Humble, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/723,739

(22) Filed: Mar. 21, 2007

(65) Prior Publication Data

US 2007/0172351 A1 Jul. 26, 2007

Related U.S. Application Data

(62) Division of application No. 10/829,281, filed on Apr. 22, 2004.

(51) Int. Cl.
*F01D 9/02* (2006.01)
(52) U.S. Cl. .................................. 415/115
(58) Field of Classification Search .............. 415/115; 29/889.1
See application file for complete search history.

(56) References Cited

U.S. PATENT DOCUMENTS

| | | | |
|---|---|---|---|
| 2,657,902 A | 11/1953 | Williams | |
| 3,650,635 A * | 3/1972 | Wachtell et al. | 415/115 |
| 4,672,727 A * | 6/1987 | Field | 29/889.721 |
| 5,060,842 A | 10/1991 | Qureshi et al. | |
| 5,269,057 A | 12/1993 | Mendham | |
| 5,419,681 A * | 5/1995 | Lee | 416/97 R |
| 5,697,151 A | 12/1997 | Werner et al. | |
| 6,331,361 B1 | 12/2001 | Esch et al. | |
| 6,575,702 B2 * | 6/2003 | Jackson et al. | 416/96 R |
| 2001/0012484 A1 | 8/2001 | Beeck et al. | |
| 2002/0197152 A1 | 12/2002 | Jackson et al. | |
| 2003/0082048 A1 | 5/2003 | Jackson et al. | |

FOREIGN PATENT DOCUMENTS

| | | |
|---|---|---|
| EP | 1 108 856 A2 | 6/2001 |
| GB | 2 054 749 A | 2/1981 |
| GB | 2 228 540 A | 8/1990 |

OTHER PUBLICATIONS

Arness et al.., entitled, "Method of Repairing the Turbine Airfoil Nozzle Segment," U.S. Appl. No. 11/723,742, filed Mar. 21, 2007, pending.

* cited by examiner

*Primary Examiner*—Richard Edgar
(74) *Attorney, Agent, or Firm*—Nixon & Vanderhye, P.C.

(57) ABSTRACT

A trailing edge coupon for the trailing edge of a airfoil of a turbine nozzle segment is welded to an airfoil section of the nozzle segment having a damaged trailing edge portion removed. The coupon includes film cooling holes spaced one from the other along a pressure side wall portion of the coupon and a plurality of radially spaced openings along the trailing edge. By welding the pressure and suction side edges of the coupon to the pressure and side edges of the remaining portion of the airfoil, the operating life of the nozzle is extended.

3 Claims, 4 Drawing Sheets

REPAIRED TURBINE NOZZLE

This application is a division of application Ser. No. 10/829,281, filed Apr. 22, 2004, the entire content of which is hereby incorporated by reference in this application.

The present invention relates to a repair of the trailing edge of an airfoil and particularly relates to a coupon having a trailing edge cooling configuration for replacement of a damaged trailing edge portion of a nozzle airfoil for a gas turbine. The present invention also relates to methods for repairing the trailing edge portion of the airfoil.

BACKGROUND OF THE INVENTION

As operational efficiencies in gas turbines have been achieved by higher firing temperatures and with enhanced aerodynamic design of the airfoils, for example, the nozzle stator airfoils, advanced turbines have adopted improved cooling configurations particularly for the trailing edges of the airfoils. It will be appreciated that the hot gases in the gas flow path of turbines may approximate 1700-1800° F. at the first stage airfoils, e.g., the nozzles. With these higher operating temperatures and the advanced aerodynamic designs of the airfoils, improved cooling systems have previously been employed to minimize and slow the rate of damage incurred by the airfoils exposed to these gases. Various configurations of trailing edge cooling systems have previously been proposed and constructed. For example, one such cooling system includes a plurality of radially spaced apertures opening through the trailing edge in combination with radially spaced film cooling holes axially spaced from and adjacent the trailing edge. The film cooling holes are provided along the pressure side, i.e., the hotter side, of the airfoil for film cooling the remaining trailing edge surfaces. Airfoils with such advanced cooling configurations have been provided in gas turbines and have extended the operating life of the turbine nozzles to nearly twice the operating hours of prior cooling configurations. As a consequence, the gas turbines may be operated, e.g., by a utility, for a significantly longer period of time before maintenance is required with the attendant cost advantages not only in terms of turbine efficiency but also turbine downtime.

Turbine airfoils have also been previously repaired by replacing damaged trailing edge portions with a new replacement trailing edge portion. Coupons which constitute a replacement trailing edge portion for a nozzle airfoil have previously been welded to the remaining leading and intermediate sections of an airfoil where the damaged trailing edge sections of the airfoil have been removed. Trailing edge coupons, however, have not heretofore been utilized to significantly extend the operating life of the turbine airfoil as they have lacked the required cooling configurations. The nozzles in current use have only a limited number of hours of operation before the airfoils of those nozzles are so severely damaged as to marginalize the efficiency of the turbine and require repair. For example, many existing turbines have airfoils with a 24,000 hour operation capability. While coupons having similar trailing edge sections as extant in the turbines can be and have been utilized as replacements for the damaged trailing sections, the hours of operational capability of the repaired nozzle airfoils have not been significantly extended and a similar operating life as the original airfoils have been anticipated.

Nozzle airfoils are typically provided in a plurality of nozzle segments arranged in a circumferential array about the turbine axis. Each segment includes inner and outer bands or platforms between which extend one or more nozzle vanes, i.e., airfoils. The segments are typically cast of expensive materials. While it is possible to replace the nozzle segments in their entirety with new nozzles, segments having improved cooling configurations permitting longer term operation, such replacement nozzle segments are prohibitively costly particularly in view of the materials and machining necessary to effect that replacement. Accordingly, there is a need for a trailing edge coupon and a method of repairing turbine airfoils which will extend the operating life of the repaired nozzles beyond the life cycle of the nozzle airfoils originally provided in the turbine.

BRIEF DESCRIPTION OF THE INVENTION

In accordance with a preferred aspect of the present invention there is provided a trailing edge coupon having enhanced cooling capability for use as a replacement for a damaged trailing edge portion of a nozzle airfoil enabling an airfoil repair to increase the operating life cycle of the turbine nozzle. The trailing edge coupon includes a plurality of film cooling holes generally radially spaced from one another along a pressure side of the coupon together with a plurality of radially spaced openings through the trailing edge. A plurality of radially spaced ribs extend between opposite pressure and suction sides of the coupon and forward edges of the coupon are chamfered for welding to remaining portions of nozzle airfoil from which the damaged trailing edge section has been removed. By welding the coupon to the remaining portion of the existing airfoil, a repaired airfoil having an extended operating life is provided. That is, the upgraded airfoil has a cooling configuration corresponding to newer airfoil configurations with advanced cooling configurations enabling extended operating life of the nozzle segments.

In a preferred embodiment of the present invention there is provided an article for repairing turbine nozzle segments each having an airfoil between inner and outer platforms with a trailing edge portion of the airfoil removed leaving intermediate and leading edge portions of the airfoil between the platforms comprising: a trailing edge coupon having pressure and suction side wall portions; a plurality of film cooling holes generally radially spaced one from the other along the pressure side wall portion of the coupon, the coupon including a trailing edge having a plurality of radially spaced openings and a plurality of radially spaced ribs extending between opposite pressure and suction sides of the coupon, edges of the pressure and suction side wall portions being chamfered for welding to pressure and suction side wall portions of the intermediate portion of the airfoil.

In a further preferred embodiment of the present invention, there is provided a repaired turbine nozzle comprising: leading edge and intermediate airfoil sections and inner and outer platforms forming remaining portions of a nozzle segment having a removed damaged trailing edge section; a trailing edge coupon having a trailing edge, pressure and suction side wall portions, a plurality of film cooling holes generally radially spaced one from the other along a pressure side wall portion of the coupon, a plurality of radially spaced openings along the trailing edge, and a plurality of radially spaced ribs extending between opposite pressure and suction sides of the airfoil, welds along opposite pressure and suction side edges of the remaining section and respective pressure and suction side edges of the trailing edge coupon whereby the remaining section and the coupon form a complete airfoil between the inner and outer platforms.

In a still further preferred embodiment of the present invention there is provided a method of repairing an airfoil of a turbine nozzle segment comprising the steps of: (a) removing a damaged trailing edge portion of the airfoil leaving a remaining airfoil section including leading edge and intermediate sections; (b) providing a trailing edge coupon having pressure and suction side wall portions, a plurality of film cooling holes generally radially spaced one from the other along a pressure side wall portion of the coupon and a plurality of radially spaced openings and a plurality of radially spaced ribs extending between opposite pressure and suction sides of the airfoil; and (c) welding along opposite pressure and suction sides of each the remaining airfoil section and the coupon respectively to secure the coupon to the remaining airfoil section.

DETAILED DESCRIPTION OF THE INVENTION

Figure 1:
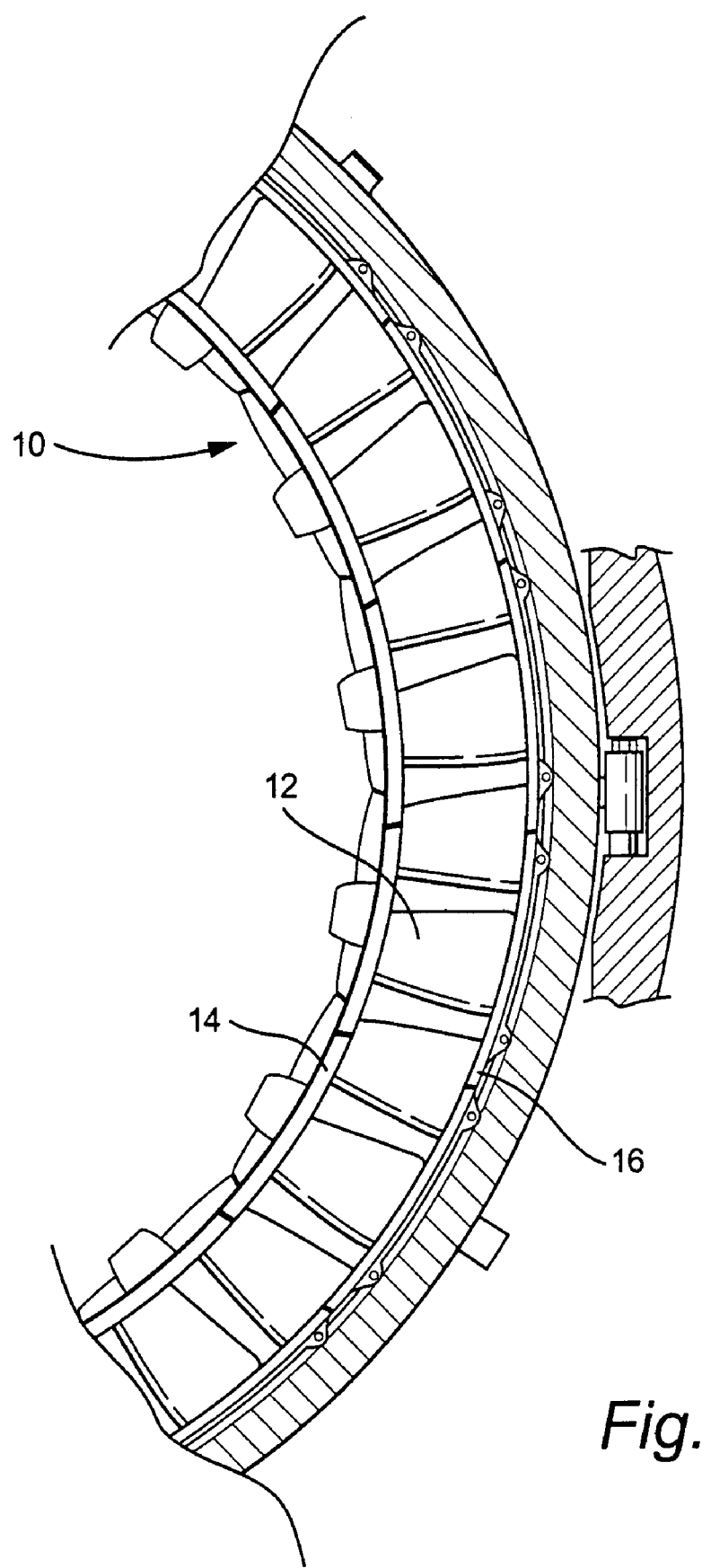
FIG. 1 is a fragmentary axial view of a plurality of nozzle segments forming part of an annular array of nozzles for a turbine stage.
Figure 2:
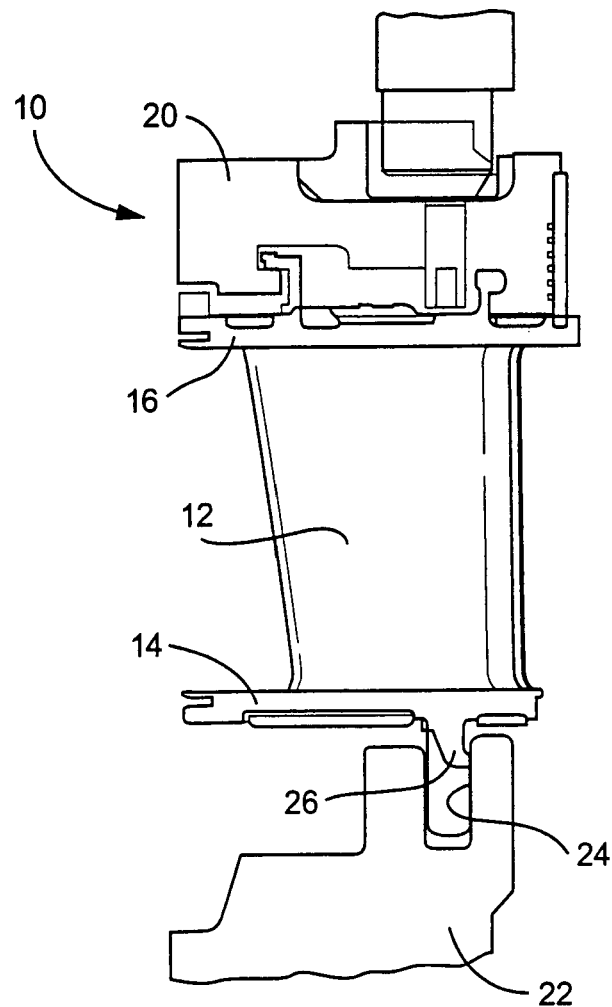
FIG. 2 is a side elevational view of a nozzle segment installed between portions of an inner and outer casing.
Figure 3:
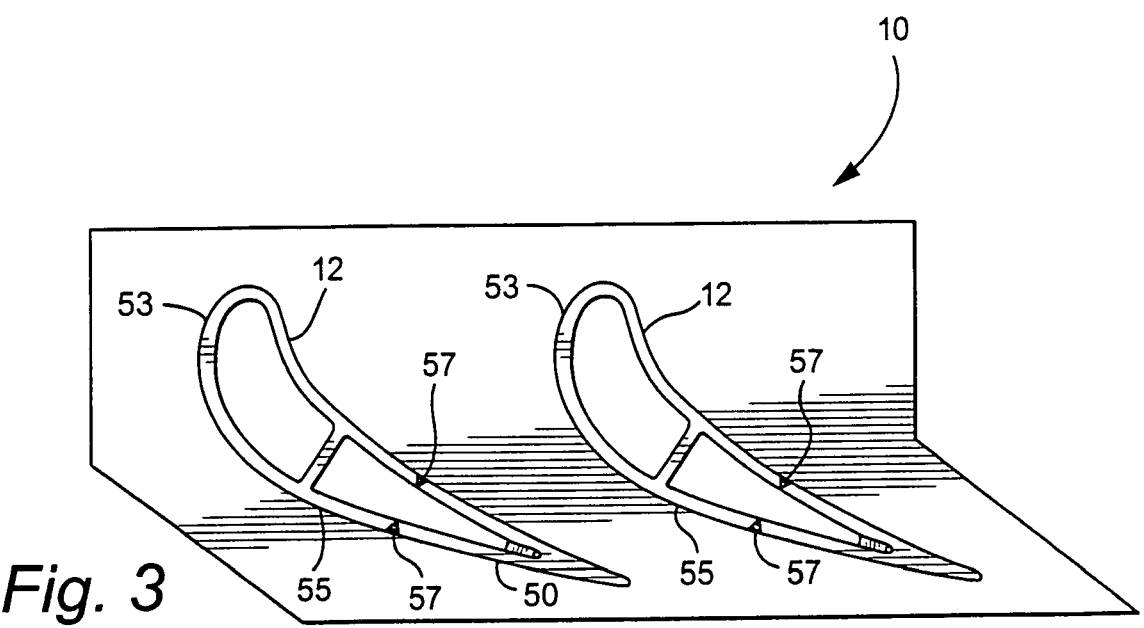
FIG. 3 is an enlarged cross-sectional view through the airfoils of a nozzle segment illustrating a coupon welded to a reusable portion of the original airfoil.

Referring now to FIG. 1, there is illustrated a plurality of circumferentially spaced nozzle segments, generally designated 10, forming part of a gas turbine and arranged in an annular array about a turbine axis. It will be appreciated that each of the segments 10 includes one or more nozzle vanes or airfoils 12 which extend between an inner platform 14 and outer platform 16. The nozzle airfoils 12 as well as the platforms 14 and 16 define in part a generally axially extending hot gas path through the turbine as well as defining a portion of a turbine stage. In FIGS. 2 and 3, the nozzle segments 10 are illustrated in greater particularity. In this embodiment, a pair of airfoils 12 form part of each segment 10 and extend between the inner and outer platforms 14 and 16, respectively. It will be appreciated that each segment may include one or more airfoils between the platforms. Also illustrated in FIG. 2 is an retaining ring 20 to which the nozzle segment is secured and an inner support ring 22 having a slot 24 for receiving a radially inwardly extending rail 26 of the inner platform 14 for securing the nozzle segment against axial movement in an aft direction.

As noted previously, the nozzle airfoils 12 frequently become cracked and oxidized in use and must be replaced. It will be appreciated that to replace the nozzle segments in their entirety is not cost effective in view of the cost of the segments and involved labor, as well as the downtime required for replacement. Moreover, replacement of worn nozzle airfoils with new airfoils typically leads to similar cracking and oxidation over time necessitating replacement once again over a similarly limited operating cycle. Consequently, there is a need for an effective repair which will not only reduce repair costs but will also extend the life of the nozzle airfoil to a greater extent that the original airfoil.

To accomplish the foregoing, it will be appreciated that the portion of the nozzle airfoil subjected to the majority of the cracking and oxidation is the trailing edge region. Regions of the nozzle airfoil forward of the trailing edge region are not subjected to the same magnitude of cracking and oxidation and therefore have extended life as compared with the trailing edge region. As a consequence, it is possible to remove the damaged trailing edge portion of the nozzle airfoil and replace that portion with a trailing edge portion or coupon which has improved cooling characteristics enabling the life of the repaired nozzle airfoil to be extended significantly beyond the life of the original airfoil, e.g., twice the life of the original airfoil.

Figure 4:
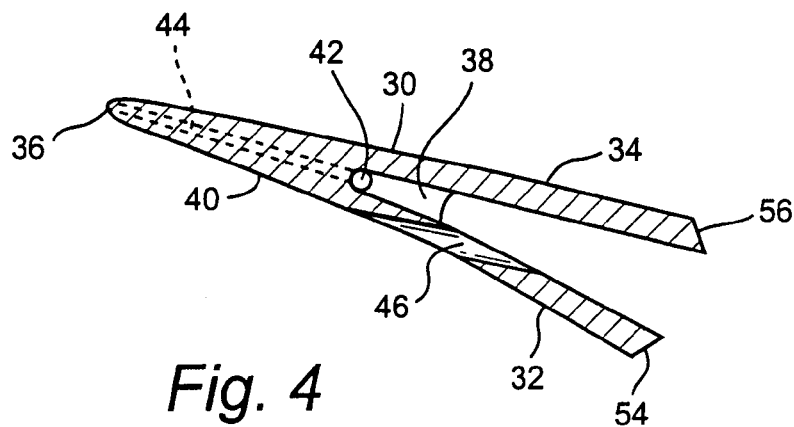
FIG. 4 is an enlarged cross-sectional view of the coupon for repairing the nozzle airfoil.
Figure 5:
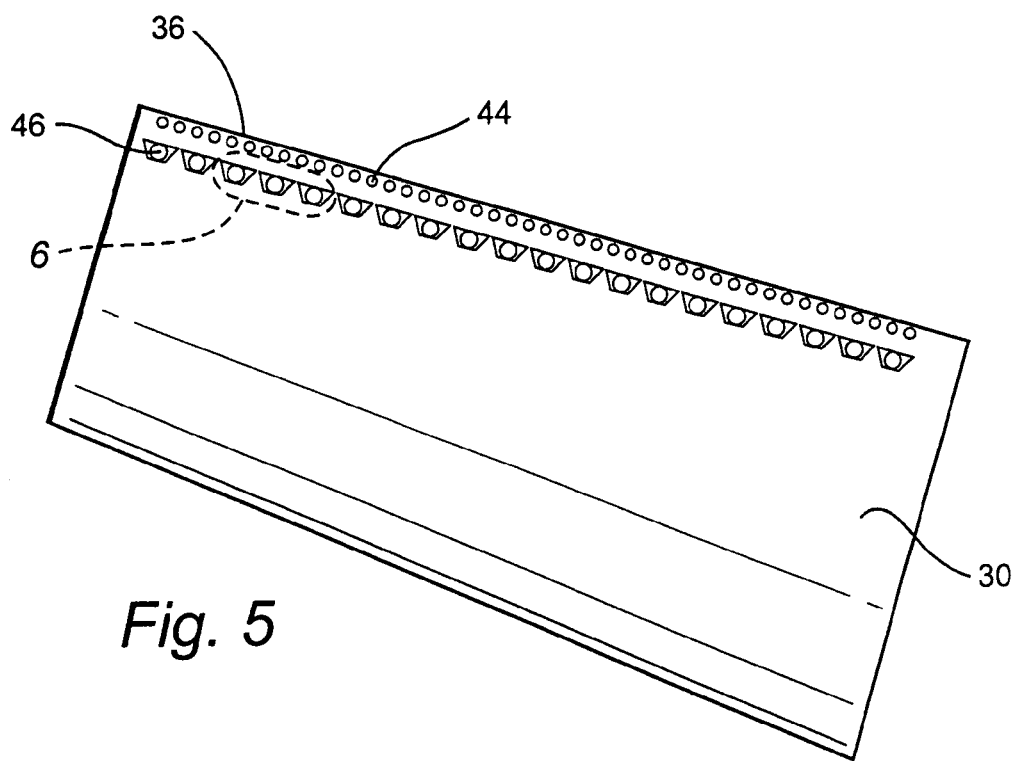
FIG. 5 is an enlarged side elevational view of the coupon of FIG. 4.
Figure 6:
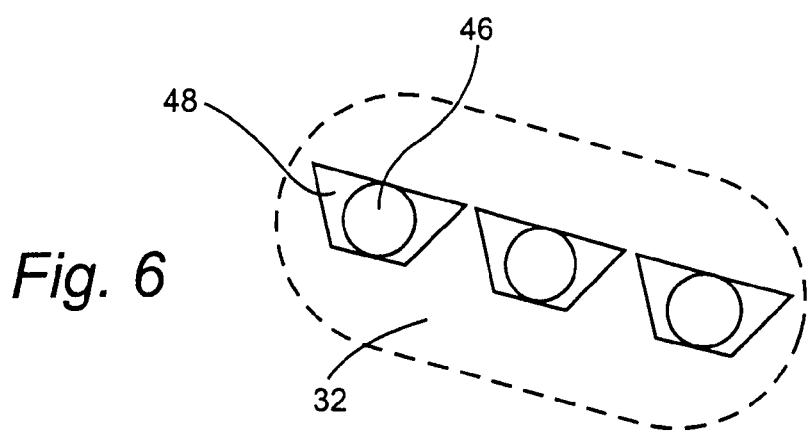
FIG. 6 is an enlarged view of the film cooling holes along the pressure side of the coupon.

Referring to FIGS. 4-6, a trailing edge coupon 30 is provided having pressure and suction side wall portions 32 and 34 respectively terminating in a trailing edge 36. Coupon 30 constitutes a replacement for a removed damaged trailing edge portion of the original airfoil. The coupon 30 is provided with a cooling configuration which slows the rate of oxidation of the trailing edge of the repaired airfoil and hence the coupon therefore enables the repaired airfoil to have an extended operating life cycle. While the cooling configuration of the coupon 30 is similar to the cooling configuration of original airfoils currently in use, those cooling configurations have not heretofore been utilized in a coupon for repair of damaged nozzle airfoils.

Referring particularly to FIGS. 4-6, the coupon 30 includes a plurality of ribs 38 which extend in the trailing edge region 40 at generally radially spaced positions between the pressure and suction sides 32 and 34 respectively. The radial spacing between the ribs 38 forms radially spaced flow channels for directing cooling air from the interior of the repaired airfoil in a generally axially aft direction for reception in a plenum 42. Plenum 42 extends substantially radially between the inner and outer extremities of the nozzle airfoil. A plurality of radially spaced passages 44 are in communication with the plenum 42 and extend in a generally axial direction terminating in exit apertures in the trailing edge 36 of the coupon 30. Thus, it will be appreciated that cooling air flowing within the repaired airfoil flows generally in an axial direction through the channels between the ribs 38 for convectively cooling the sides of the airfoil and exits into the plenum 42. The cooling air is then discharged through the passages 44 and the trailing edge 36 cooling the opposite sides of the airfoil as the air traverses from plenum 42 to the trailing edge 36.

Additionally, along the pressure side 32 of the coupon 30, there are provided a plurality of generally spaced film cooling holes 46. Cooling air within the repaired airfoil also flows through the film cooling holes 46 and along the pressure side wall 32 of the repaired airfoil to film cool the pressure side trailing edge region. The film cooling holes 46 have external surfaces along the pressure side which are flared as indicated at 48 in FIG. 6. The flare enlarges in the radial and axially aft directions such that the film of cooling air is distributed to overlie substantially the entirety of the pressure side surface of the trailing edge region 40 to the trailing edge 36. With the film cooling holes 46, the flared surfaces thereof as well as the cooling passages 44 exiting through the trailing edge 36, the repaired airfoil containing such cooling configuration has reduced oxidation and potential for cracking.

Figure 9:
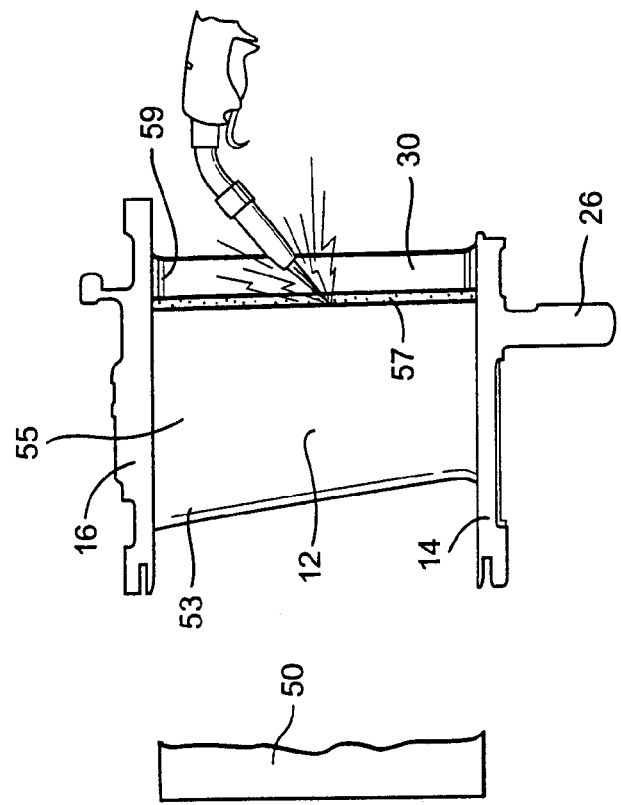
FIGS. 7-9 are schematic illustrations of the manner of repairing the nozzle airfoil.
Figure 8:
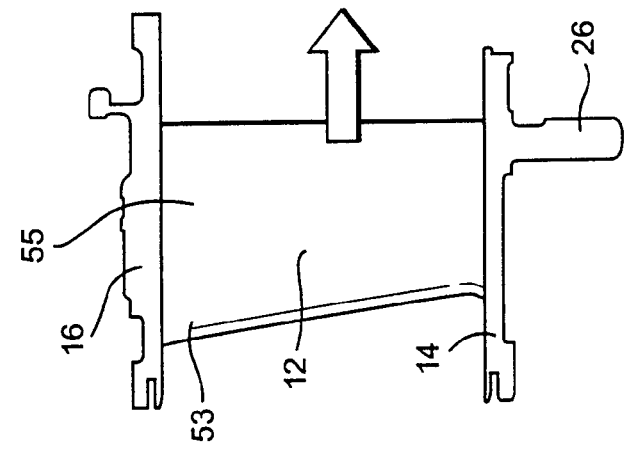
Figure 7:
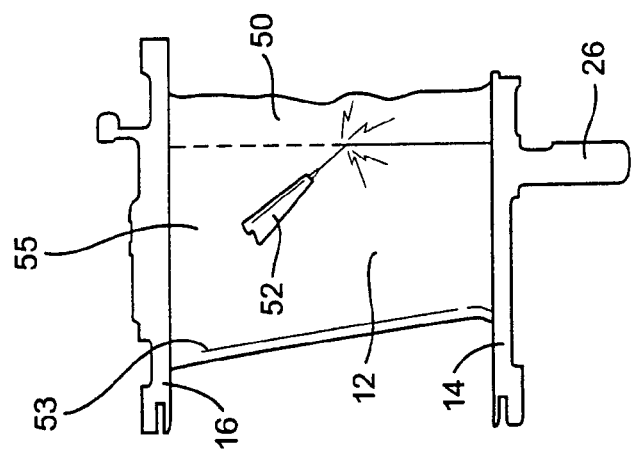

To repair the damaged airfoil and with reference to FIGS. 7-9, the nozzle segments are removed from the turbine. The damaged trailing edge regions 50 of the airfoils of the removed segments are removed from the airfoils 12. Particularly, the airfoils are cut along both the pressure and suction sides a predetermined distance from the trailing edge and are also cut along the juncture of the trailing edge region being removed and the inner and outer platforms 14 and 16, respectively. The cutting may be effected by a water jet cutter, wire EDM or a plasma torch as schematically illustrated at 52 in FIG. 7. The trailing edge region 50 which has been damaged is thus removed as illustrated in FIG. 8 leaving discrete edges along the pressure and suction sides of the original airfoil. Those edges are cleaned and shaped to receive corresponding edges 54 and 56 (FIG. 4) of the coupon 30. The remaining portions of the airfoil include leading edge of intermediate portions 53 and 55, respectively.

Particularly, as illustrated in FIG. 9, the coupon 30 is disposed between the inner and outer platforms and the pressure and suction side edges 54 and 56 are welded to the pressure and suction side edges of the remaining portion of the airfoil to form a repaired airfoil having the same aerodynamic configuration as the original airfoil. Additionally, however, it will be appreciated that the cooling configuration of the trailing edge of the repaired airfoil has been changed by the removal of the damaged trailing edge region 50 and the addition of the coupon 30 with the aforedescribed cooling configuration.

The weld-up of the coupon 30 to the remaining portion of the airfoil may be accomplished for example by a TIG welding process. The welds 57 proceed along the opposite sides of the airfoil between the inner and outer platforms and also between the radial outer and inner edges of the coupon and the outer and inner platforms. The welds are cleaned to provide a smooth surface and fillets 59 (FIG. 9) are applied as necessary and blended with the repaired airfoils having the advanced cooling configuration in each of these segments.

The segments are then replaced into the turbine. Because of the new cooling configuration provided by the coupon repair, the operating life cycle of the nozzle airfoils is significantly increased. Cracking and oxidation are reduced and the interval between repairs is greatly increased, e.g., by a factor of two.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A repaired turbine nozzle comprising:

leading edge and intermediate airfoil sections and inner and outer platforms forming remaining portions of a nozzle segment having a removed damaged trailing edge section;

a trailing edge coupon having a trailing edge, pressure and suction side wall portions, a plurality of film cooling holes generally radially spaced one from the other along the pressure side wall portion of the coupon, a plurality of radially spaced cooling air exit openings along the trailing edge in communication with an internal, radially extending plenum, and a plurality of radially spaced ribs extending between opposite pressure and suction sides of the airfoil defining a plurality of cooling channels such that cooling air flowing through the channels flows into said plenum and exits through said cooling air exit openings; and welds along opposite pressure and suction side edges of the remaining section and respective pressure and suction side edges of the trailing edge coupon whereby the remaining section and the coupon form a complete airfoil between the inner and outer platforms.

2. A repaired nozzle according to claim 1 wherein the number of cooling air exit openings exceeds the number of film cooling holes by a factor of at least two.

3. A repaired nozzle according to claim 1 wherein said film cooling holes are generally cylindrical and flared by tapered portions of the pressure side wall portion of the coupon for distributing air substantially from the holes over downstream surfaces of the pressure side wall portion enabling film cooling of substantially the entirety of the trailing edge portion of the coupon downstream of the holes.

* * * * *